United States Patent
Eastlack et al.

(10) Patent No.: US 12,221,274 B1
(45) Date of Patent: Feb. 11, 2025

(54) CONTAINERIZED POWER GENERATION

(71) Applicants: Edward J. Eastlack, Metairie, LA (US); William S. Lerner, Litchfield, CT (US)

(72) Inventors: Edward J. Eastlack, Metairie, LA (US); William S. Lerner, Litchfield, CT (US)

( * ) Notice: Subject to any disclaimer, the term of this patent is extended or adjusted under 35 U.S.C. 154(b) by 570 days.

(21) Appl. No.: 17/674,338

(22) Filed: Feb. 17, 2022

Related U.S. Application Data

(60) Provisional application No. 63/151,346, filed on Feb. 19, 2021.

(51) Int. Cl.

| | | |
|---|---|---|
| *B65D 88/12* | (2006.01) | |
| *B60L 1/00* | (2006.01) | |
| *B60P 3/00* | (2006.01) | |
| *H02J 3/38* | (2006.01) | |
| *H02S 10/20* | (2014.01) | |
| *H02S 10/40* | (2014.01) | |

(52) U.S. Cl.
CPC .............. *B65D 88/121* (2013.01); *B60L 1/00* (2013.01); *B60P 3/00* (2013.01); *H02J 3/381* (2013.01); *H02S 10/20* (2014.12); *H02S 10/40* (2014.12)

(58) Field of Classification Search
CPC ....... B65D 88/12; B65D 88/121; H02S 10/20; H02S 10/40; B60L 1/00; B60P 3/00; H02J 3/38; H02J 3/381
See application file for complete search history.

(56) References Cited

U.S. PATENT DOCUMENTS

| | | |
|---|---|---|
| 10,340,696 B2 | 7/2019 | Paine et al. |
| 2014/0097182 A1 | 4/2014 | Sheesley |

FOREIGN PATENT DOCUMENTS

| | | | | |
|---|---|---|---|---|
| GB | 2463098 A | * | 3/2010 | ........... B65D 88/121 |

OTHER PUBLICATIONS

Container vessels Energy-smart integrated power solutions, ABB, Aug. 2012.
Miles to Go, Michael Roeth, Jul. 17, 2015.
UN Body Adopts Climate Change Strategy for Shipping, Marine Insight, Apr. 16, 2018.
Why Freight Matters to Supply Chain Sustainability, United States Environmental Protection Agency, Jan. 27, 2020.

* cited by examiner

*Primary Examiner* — Robert L Deberadinis
(74) *Attorney, Agent, or Firm* — Appleton Luff

(57) ABSTRACT

A transportation vehicle includes one or more spaces to accept one or more moveable shipping containers. Certain of the shipping containers has attached to one or more exterior surfaces one or more photovoltaic panels that together occupy substantially all of the corresponding exterior surface and wherein none of the one more photovoltaic panels extends beyond an outer boundary of the corresponding exterior surface. Each shipping container with a photovoltaic panel includes a first container electrical connector to provide electrical energy generated by the one or more photovoltaic panels attached to the shipping container. An electrical grid includes one or more first grid connectors, where each first grid connector is adapted to attach to a first container electrical connector. One or more energy storage units is connected to the electrical grid to store energy generated by the shipping containers that has a photovoltaic panel.

21 Claims, 18 Drawing Sheets

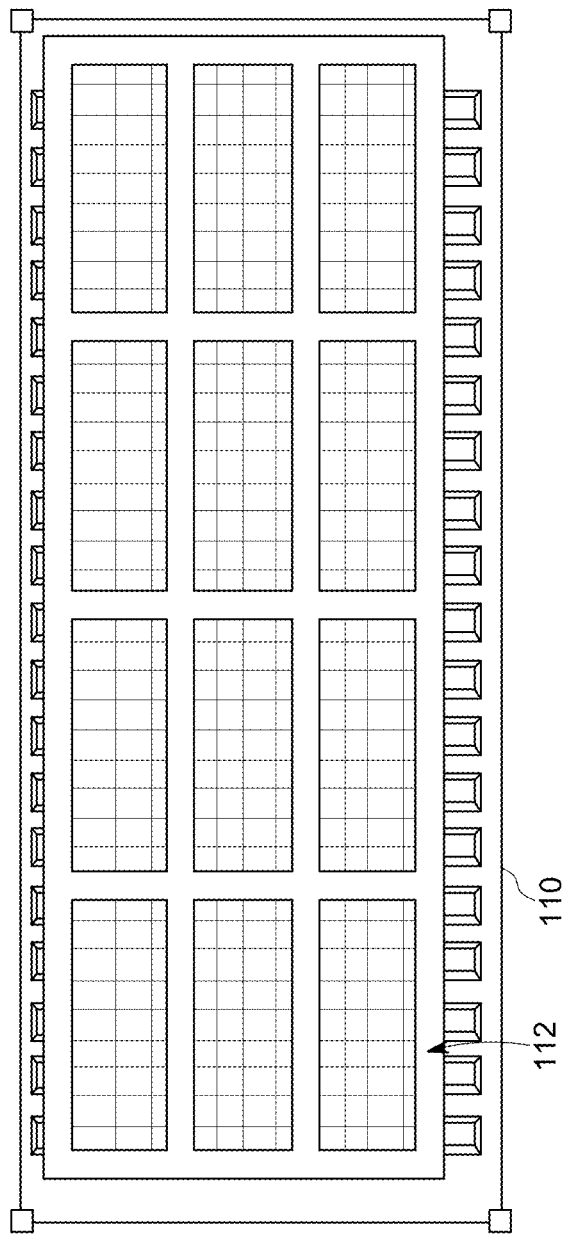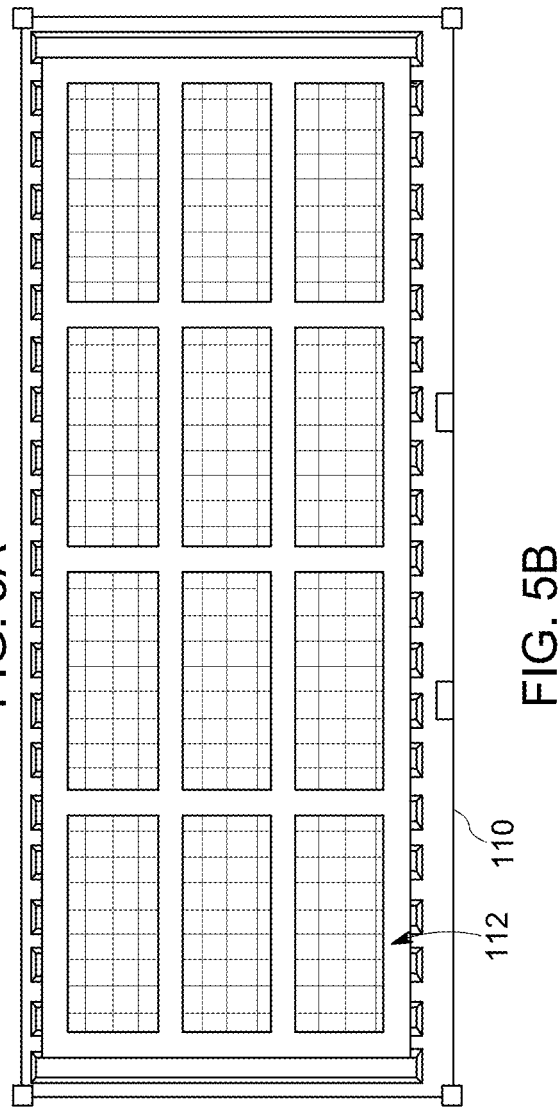

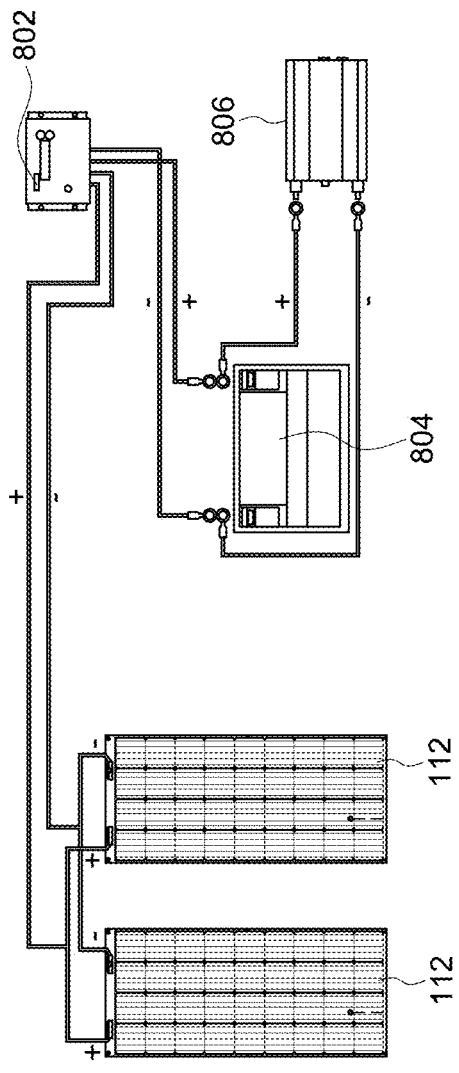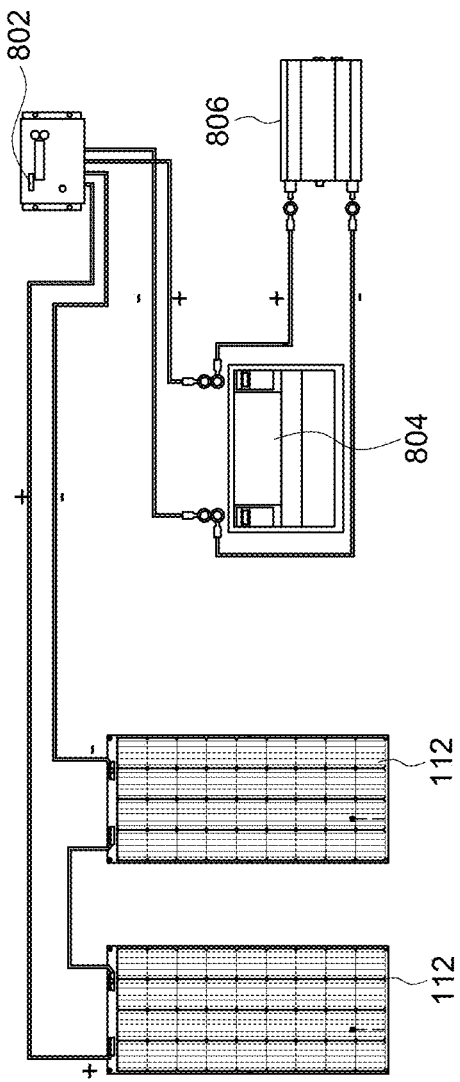
FIG. 8A
FIG. 8B

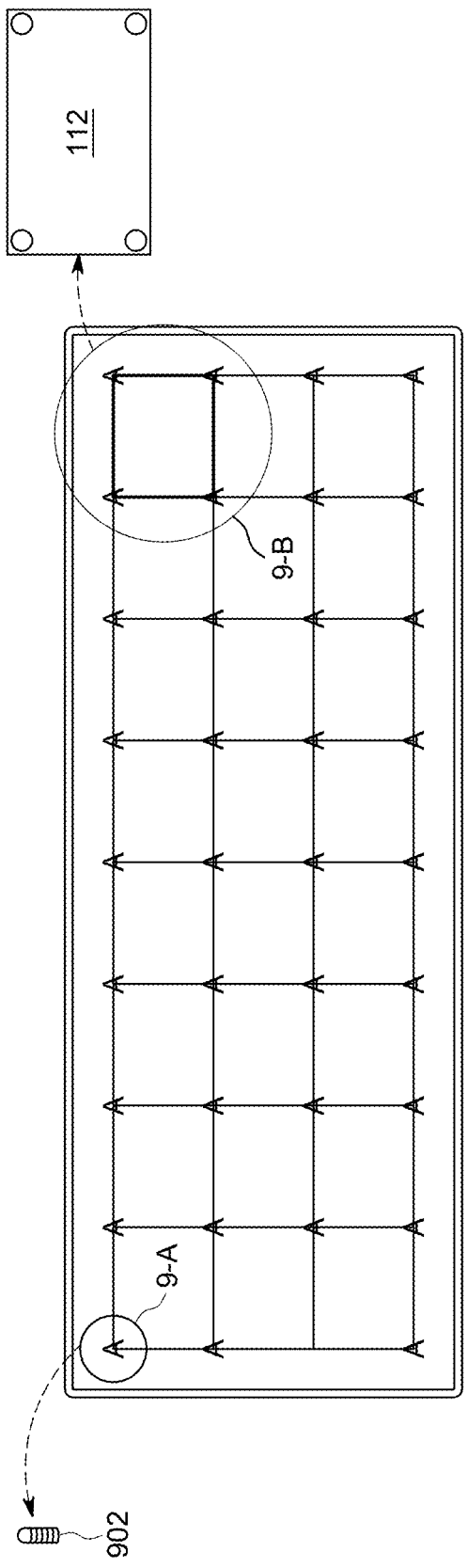
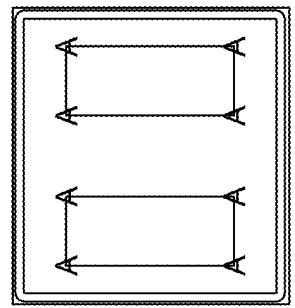
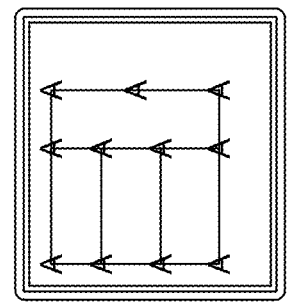
FIG. 9A
FIG. 9B
FIG. 9C

CONTAINERIZED POWER GENERATION

RELATED APPLICATIONS

This application claims priority to U.S. provisional patent application 63/151,346 filed on Feb. 19, 2021, entitled "CONTAINERIZED POWER GENERATION;" which application is hereby incorporated by reference in its entirety.

FIELD OF THE DISCLOSURE

This disclosure relates generally to transportation of items and in particular to vehicles and containers for transportation of goods.

Vehicles, which include land based, water based and air-based vehicles, that are used to move goods typically require large amounts of energy. Conventionally, such freight vehicles use carbon-based fuels (e.g., gasoline, diesel, jet fuel), the use of which is known to produce harmful emissions such as particulate matter, hydrocarbons, and other pollutants such as nitrous oxide and sulfur dioxide. In particular, there is a growing concern over emissions from cargo ships, both while at sea, in port, and approaching and departing port.

The harmful effects of such pollution are being recognized and efforts are underway to achieve long term reductions in such pollution. For example, the United Nations International Maritime Organization (IMO) has adopted an initial strategy on the reduction of greenhouse gas emissions from ships and phase them out, as soon as possible in this century. See, *UN body adopts climate change strategy for shipping*, International Maritime Organization, Apr. 13, 2018 (http://www.imo.org/en/MediaCentre/PressBriefings/Pages/06GHGinitialstrategy.aspx). The United States Environmental Protection Agency (EPA) has noted that "[a]s freight activity in the United States increases, projections are that" by 2025 "growth in air emissions from freight will exceed growth in emissions from all other transportation activities, including passenger transportation." *Why Freight Matters to Supply Chain Sustainability*, epa.gov, (https://www.epa.gov/smartway/why-freight-matters-supply-chain-sustainability).

A number of solutions have been proposed to reduce harmful emissions generated by freight transportation vehicles by employing alternative energy sources such as hydrogen and batteries. While these solutions may reduce harmful emissions when in use, they require energy in their production and such energy itself may produce harmful emissions. There accordingly remains a need for more efficient production of energy for freight transportation vehicles.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques.

FIG. 5A is a side view of first side of a shipping container with solar panels attached thereto.

FIG. 5B is a side view of second side of a shipping container with solar panels attached thereto.

FIGS. 8A and 8B are alternative embodiments of electrical connection of solar panels in various embodiments.

FIGS. 9A, 9B and 9C illustrate details of one embodiment of mounting of solar panels to a shipping container.

Figure 1:
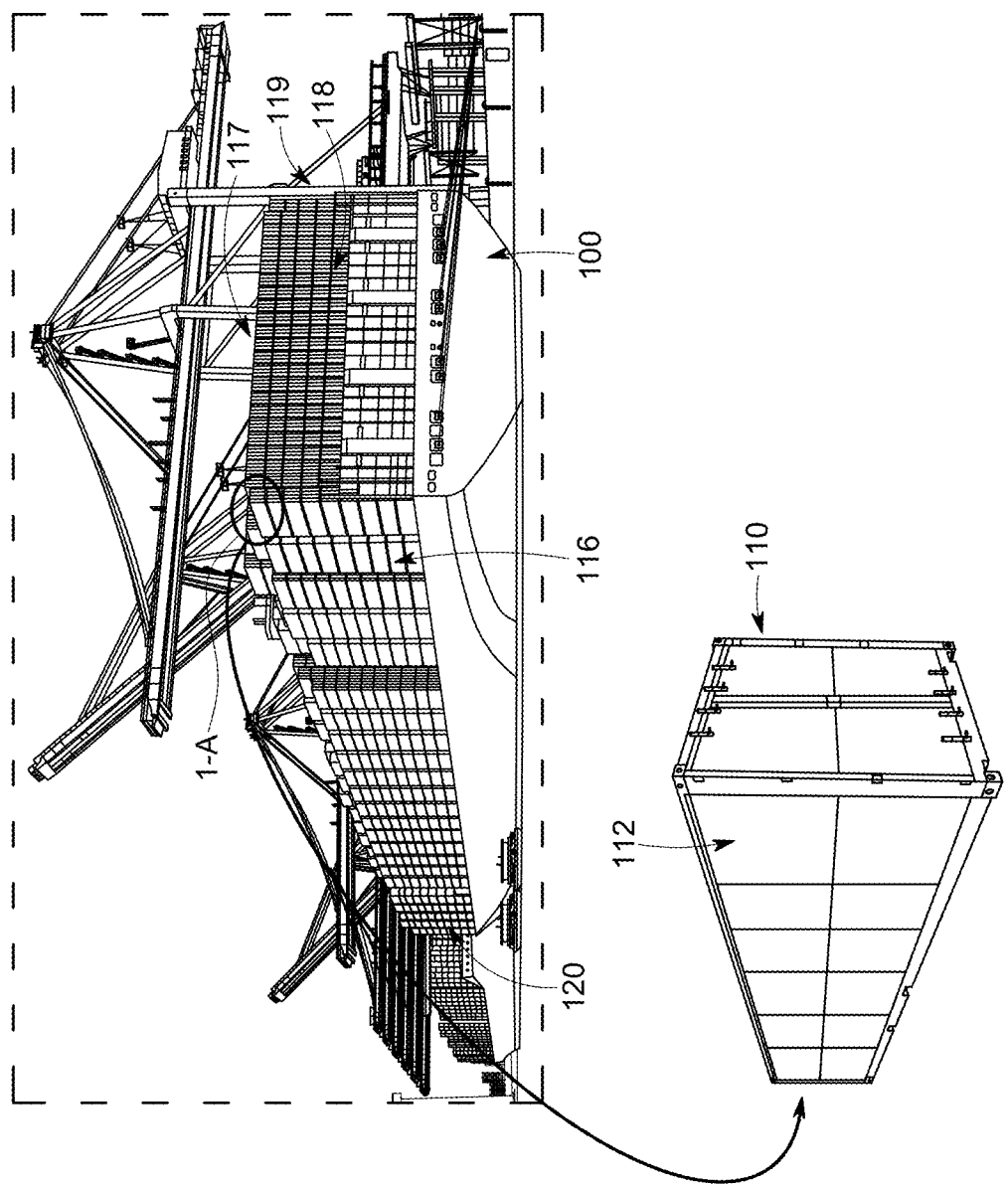
FIG. 1 is a perspective view of transportation vehicle in the form of a watercraft in background with a zoomed in view of a shipping container with solar panels.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The disclosed embodiments operate to generate renewable energy from surface areas currently available on transportation vehicle, such as container ships and freight trains and trucks. This energy in various embodiments may be stored or immediately used for various purposes on the transportation vehicle, such as to power the vehicle or to power ancillary devices on the vehicle. The generated power may be stored in a variety of forms such as in a battery or by being converted to, for example, hydrogen that is compressed to some degree, and in some embodiments to liquid form. A number of the disclosed embodiments employ a conventional intermodal shipping container, modified as described herein, to generate electrical energy.

Certain disclosed embodiments make use of the available external surface area of intermodal shipping containers to harvest solar energy. This energy can then be stored as potential energy or used directly by the corresponding ship, truck, barge or train for propulsion or auxiliary power. This provides a source of clean energy to the intermodal transportation system as a whole that is intrinsic to the standard shipping container. The solar panels attached to the container are generally sufficiently thin to not change the external dimensions of the container or add any significant weight. In certain embodiments, the internal cargo area is not changed. In other embodiments some internal cargo area is consumed by recessing certain of the solar panels and/or by the corresponding attachment hardware and/or associated electrical components. In certain embodiments, the commodity carried inside the container can be the generated, stored renewable energy, which can be stored by way of various energy storage technologies. This energy can be transported and used worldwide.

As an example, each container surface area is capable of harvesting 15-20 kW of solar energy×5 hrs per day (75 kWh per day). A typical container ship may handle thousands of these containers, so the potential solar harvesting is in the gigawatt range. Some containers can be designated for energy storage, and some can carry other commodities. Modern container vessels are carrying an increasing number of refrigerated containers (commonly called reefers) which increase power demands of the vessel's cargo. The additional power generated by disclosed embodiments helps to address this growing demand for electrical energy aboard a cargo vessel. Other transportation vehicles such as barges, trucks and trains may transport lower numbers of containers but can also benefit from the additional power generated from such containers.

Container ships, barges, trains, truck and terminals have very little space for solar panels or clean energy storage, so the disclosed embodiments provide a solution that combines the energy generation and storage as well as a clean energy solution for the entire intermodal supply chain. In certain embodiments, existing intermodal containers can be converted to harvest solar energy without compromising their original function as an intermodal container. Additionally, in certain embodiments, the generated energy may be stored within an intermodal container utilizing a wide range of available energy storage technologies. The disclosed embodiments allow the harvesting of vast amounts of solar energy within an intermodal supply chain that has limited available space. In other embodiments, a container or multiple containers can be plugged directly into the existing grid of a vessel (auxiliary or ship/train/barge propulsion) or the energy can be stored in another container designated for energy storage.

FIG. 1 is a perspective view of a transportation vehicle 100 in background in the form of a watercraft with a zoomed in view seen at 1-A of a shipping container 110 having a plurality of solar panels 112 attached thereto. The solar panels 112 referred to herein may take a variety of different types of PhotoVoltaic (PV) panels that generate electrical energy from solar energy and may include rigid panels, flexible panels employing laminate, and/or may take the form of Building Integrated Photovoltaics (BIPV) which are photovoltaics panels that resemble roofing tiles or shingles.

Figure 2:
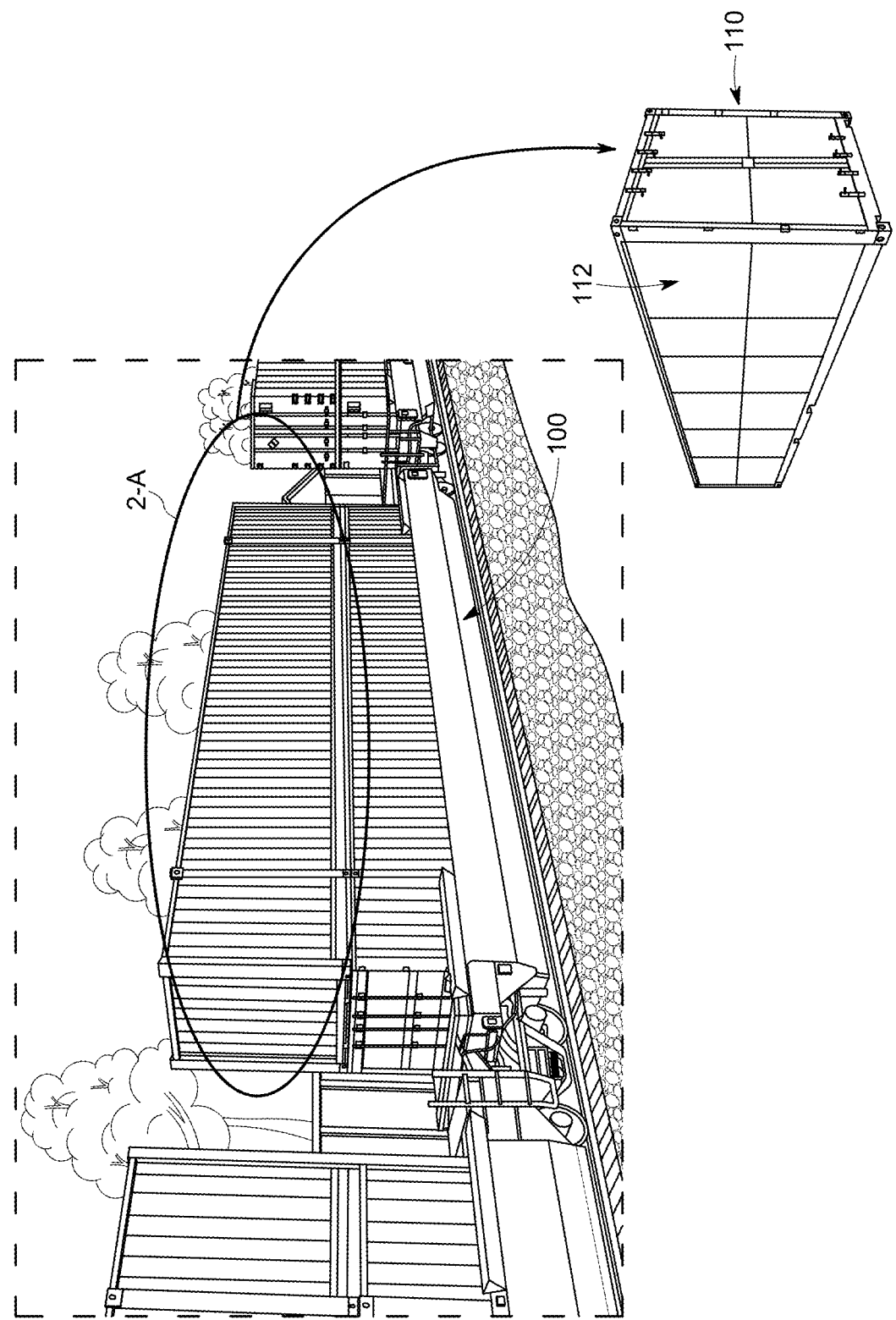
FIG. 2 is a perspective view of transportation vehicle in the form of a train in background with zoomed in view of shipping container with solar panels.
Figure 3:
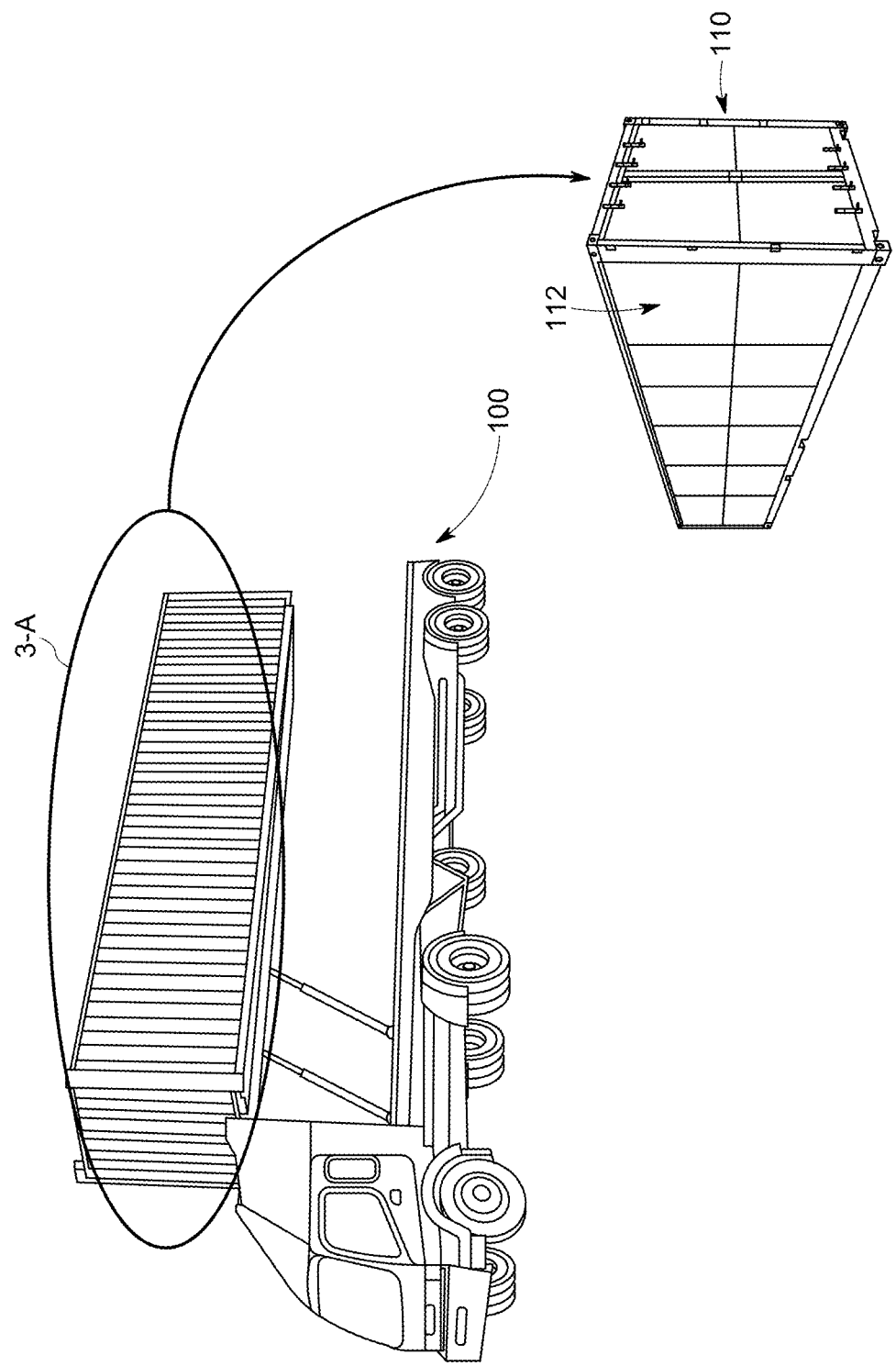
FIG. 3 is a perspective view of transportation vehicle in the form of a truck in background with zoomed in view of shipping container with solar panels.

The watercraft shown takes the form of cargo vessel configured to transport cargo stored in a plurality of shipping containers. The shipping containers are each typically an Inter-Modal Container (IMC), also referred to as a shipping container that is adapted for intermodal freight transport. An IMC, as the name suggests, may be used across multiple modes of transport, such as the ship shown in FIG. 1, the train in FIG. 2 (with zoomed in view 2-A) and the train in FIG. 3 (with zoomed in view 3-A). This permits cargo to be moved using multiple forms of transport without having to unload and reload the cargo. An IMC may be of a variety of sizes. Most commonly, an IMC takes the form of a "dry freight" or "general purpose" container which is a durable closed steel box, generally 8 feet wide and either 20 or 40 feet long with a height of 8 feet 6 inches or 9 feet 6 inches. IMCs may be stacked, as shown in FIG. 1 and this is facilitated byway of a twistlock fitting at each of the eight corners of an IMC.

An IMC takes the form of a cuboid, i.e., a box-shaped object with six flat faces where all angles are right angles. Each of the six flat faces has an exterior surface that faces the exterior of the cuboid and an interior surface that faces the interior of the cuboid. The six exterior surfaces form the exterior surface of the cuboid and the six interior surfaces form the interior surface of the cuboid. The shipping containers disclosed herein have mounted to one or more exterior surfaces, one or more solar panels 112 that each produce electrical energy from solar energy. In various embodiments, a shipping container may have one or more solar panels 112 mounted to one or more exterior surfaces. Typically, the bottom surface of a shipping container will not be exposed to sunlight so mounting a solar panel 112 to a bottom exterior surface of a shipping container will not make sense. The other five exterior surfaces may at various times, either during transport or while stationary (such as at a port or freight terminal), be exposed to sunlight and may therefore have solar panel(s) mounted thereto to maximize solar power generation.

IMCs can be constructed in a variety of ways from different materials but in general, an IMC will be constructed of a rigid frame, e.g., steel, comprised of corner posts and a floor frame that has a plurality of floor braces. Such containers typically have corrugated walls on the top and sides which are welded to the floor rails and end frames. Typically, hinged doors, also comprised of corrugated walls are mounted at one end of the container. Flooring panels are typically mounted to the floor frame. The corner posts are typically formed to have castings with openings for twistlock fasteners at each of the eight corners, to allow gripping the container from above, below, or the side. This permits a stacked container to be mechanically fastened to the container above and/or below and sometimes to the side.

In the embodiment of FIG. 1, the containers on the ship may be placed on the deck of the ship, as seen, stacked in multiple columns across the width and length of the deck. The containers may also be placed within the ship, below the deck. Certain of the containers placed on the deck will have one or more exterior surfaces exposed to sunlight. These containers include those with a face on the port side (116), top side (117), aft or stern side (118) and starboard (119) and fore or bow side (120) (not shown) of the ship. The exterior surfaces of containers exposed to sunlight will generate, by way of the panels 112 positioned on such exterior surfaces, electrical energy. Panels 112 that are not exposed to direct sunlight, such as those on surfaces not on the port, top, aft or starboard sides of the ship will not generate much if any electrical energy.

Current container ships can hold a large number of shipping containers and not all containers loaded onto such a ship will necessarily be equipped with solar panels 112 as the container 110. The generation of electrical energy can be optimized by placement of the containers on the ship 100 to maximize the number of surfaces of containers with solar panels 112 that are exposed to sunlight. For example, containers with no solar panels 112 can be placed under deck or on interior columns and lower rows where all surfaces are shielded from direct sunlight. The top side 117, which win typically receive the most direct sunlight can be populated with containers with solar panels 112 on at least the upper surface. A similar practice can be followed for the port 116, starboard 119, aft 117 and aft 120 sides of the ship 100. Similar practices may be followed for other vessels such as the train seen in FIG. 2 and the truck seen in FIG. 3.

Further details of the placement of the solar panels 112 on a container 110 may be seen in FIGS. 4A, 48, 5A, 5B, 6A, and 6B. These are examples and illustrate the various possible placement of solar panels 112 on the various upper, side and end surfaces of a container 110. In general, the placement of solar panels 112 should maximize the surface area covered but should not interfere with the normal usage of a container such as the opening and closing of doors and the stacking of containers. Not shown in FIGS. 4A,4B, 5A, 5B, 6A and 6B is hardware required to electrically connect the panels 112. Electrical wiring in most embodiments will be routed between the panels 112 and the surface of the container. The sides and roof of a container 112 are often constructed of corrugated sheet metal and the space (channels) provided by such corrugation can be employed to route wiring required for electrically connecting the panels 112. One or more conduits for electrical wiring may also be required along the top and/or bottom edge of a container to an electrical junction box. The corrugated sides of a container can create aerodynamic drag during road or rail transport and the solar panels 112, if positioned to cover a substantial portion of sides of a container, can aid in reducing aerodynamic drag.

Figure 4B:
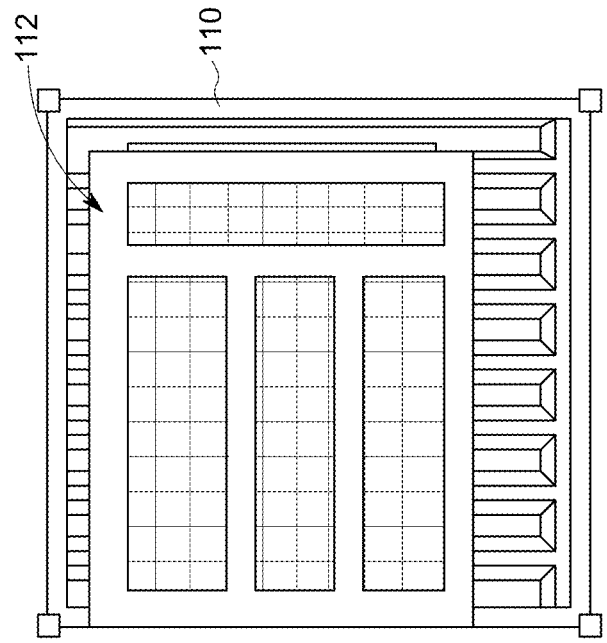
FIG. 4B is an end view of second end of a shipping container with solar panels attached thereto.
Figure 4A:
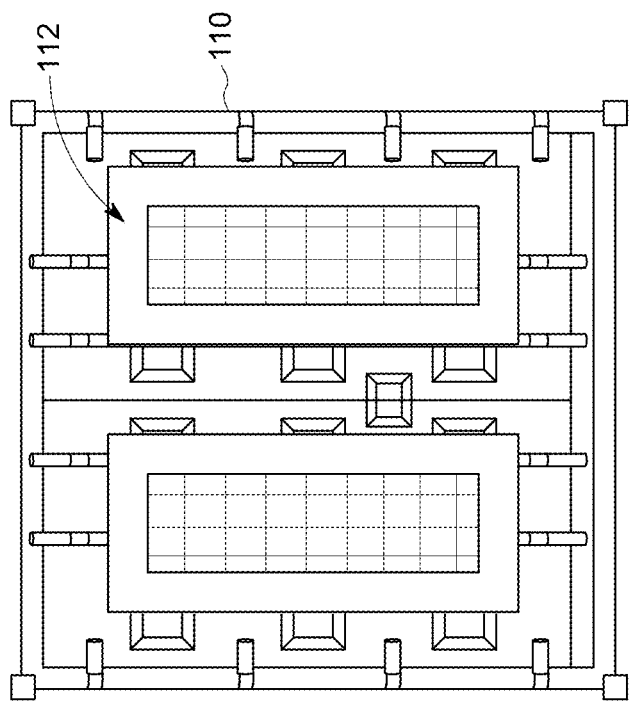
FIG. 4A is an end view of first end of a shipping container with solar panels attached thereto.
Figure 6A:
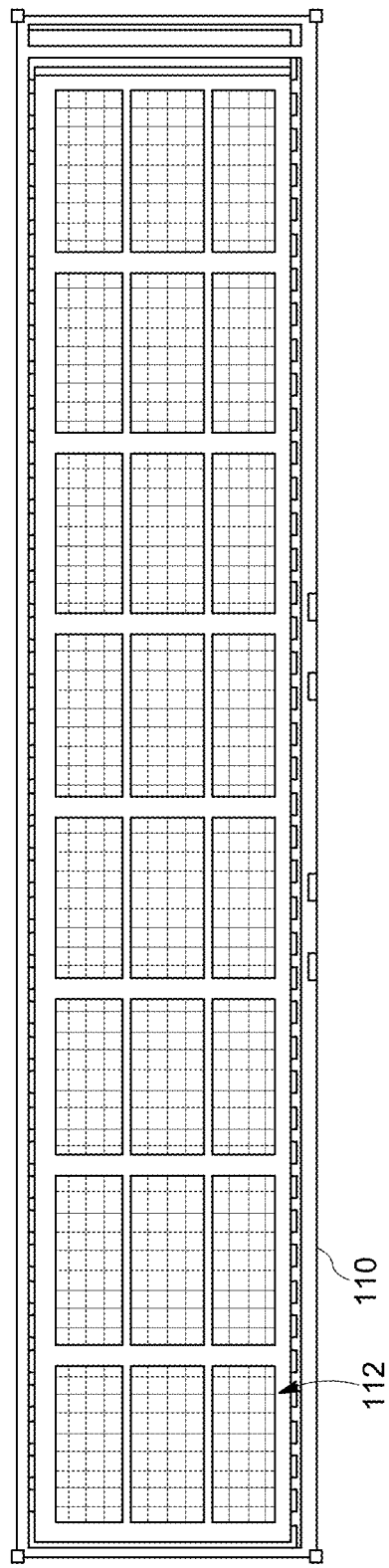
FIG. 6A is a side view of a first side of a shipping container of a different length than that shown in FIG. 5A with solar panels attached thereto.
Figure 6B:
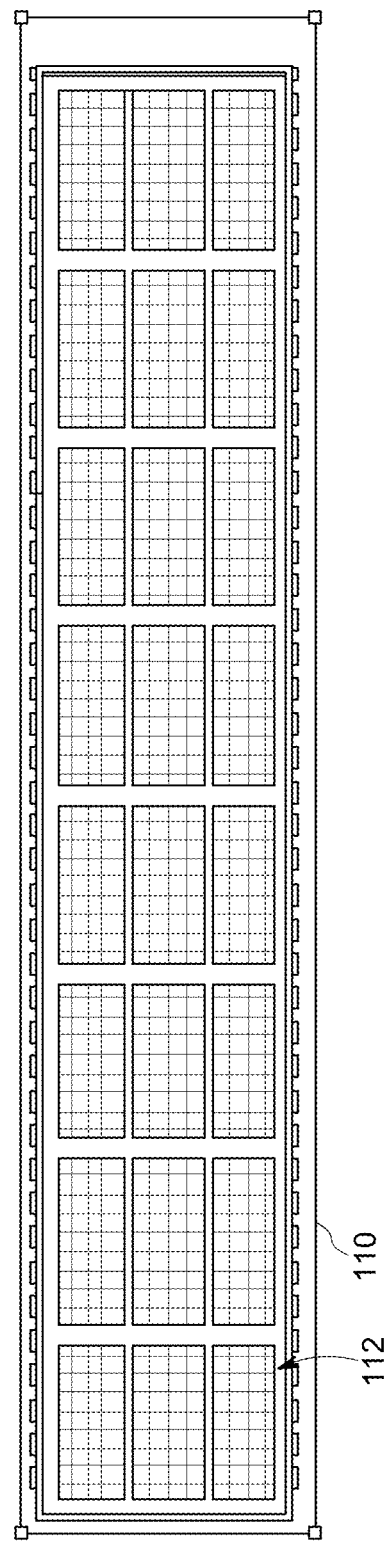
FIG. 6B is a side view of second side of the shipping container of FIG. 6A with solar panels attached thereto.

FIG. 4A shows a sample placement of solar panels 112 on an end of a container 110 that contains hinged doors. As seen, each hinged door has mounted thereto a solar panel 112 that consumes a substantial portion of the corresponding door. The solar panel 112 needs to be mounted in a manner to not interfere with the latch and locking mechanisms of the door. FIG. 4B shows a sample placement of solar panels 112 on an end of a container 110 that does not contain doors. As seen, four solar panels 112 are attached to the end of the container 110 with three solar panels 112 being horizontally oriented and positioned side by side. One solar panel 112 is oriented vertically and is positioned adjacent to an end of each of the three horizontally oriented solar panels. FIGS. 5A and 5B each show a sample placement of solar panels 112 on sides of a container 110. As seen, the placement on each side is the same with twelve solar panels being horizontally oriented in a three high by four wide configuration. FIGS. 6A and 6B each show a sample placement of solar panels 112 on sides of a container 110 that is longer than the container 110 in FIGS. 5A and 5B. As seen, the placement on each side is the same with twenty-four solar panels being horizontally oriented in a three high by eight wide configuration. The solar panel configurations shown in FIGS. 4A, 4B, 5A, 5B, 6A, and 6B are merely examples. The number and configuration of solar panels on a container will vary as a function of the size of each panel and the size and characteristics of the particular container.

Figure 7:
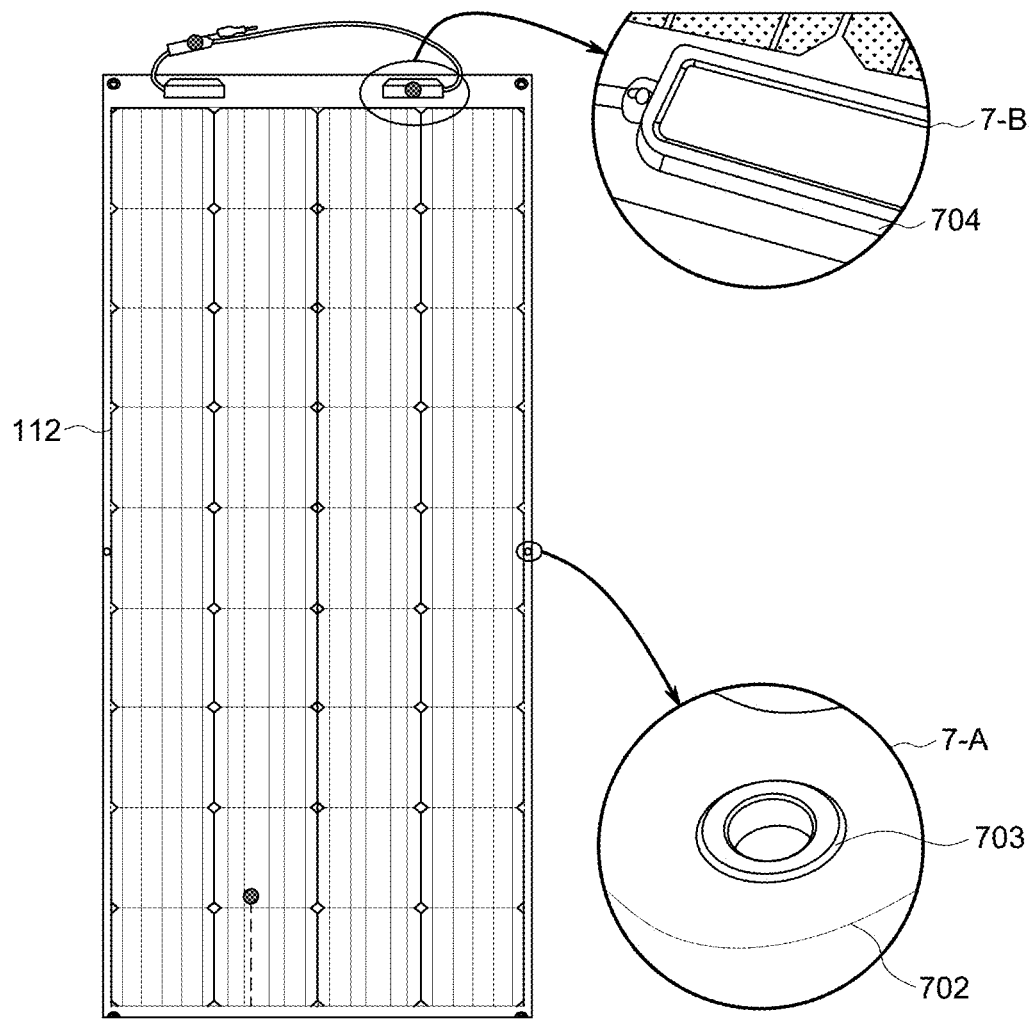
FIG. 7 is a front view of one embodiment of a solar panel that may be used in certain disclosed embodiments.

FIG. 7 illustrates details of one type of solar panel 112 that may be employed. As seen at expanded view 7-A the panel 112 has a backing material 702 mounted on the bottom surface. Grommets 703 in the backing extend beyond the edge of the panel and serve as mounting points for the panel Junction box 704 that is seen in greater detail at expanded view 7-B may be attached to the underside of the panel in a channel created by corrugation, if available. The backing can provide some physical protection to the panel from any incidental movement of the panel that may occur with respect to the container surface. An additional protective layer positioned between the backing 702 and the exterior surface of the panel 110 may be employed depending on the construction of the particular panel.

The solar panel 112 shown in FIG. 7 may be mounted in one embodiment by way of the six grommets (eyelets) to an aluminum frame consisting of lightweight aluminum flat bar. In such an embodiment, the six eyelets of each panel slide over an approximately 2 mm diameter threaded aluminum round stock that is tig welded to the face of the flat bar and then another piece of flat bar with pre-drilled holes slides over the top of the panel and then the two pieces of flat bar are tightened together with the panel in between with lock washers and wing nuts. In one embodiment, the aluminum flat bar, made of aluminum, has dimensions of approximately ⅛"×½" and cut to needed lengths. Framing size is in accordance with the dimensions of the container. Additional fasteners such as zip ties may be added for securing electrical cabling and voltage regulators if the voltage regulation is not intrinsic to the photovoltaic panel. For example, a 40' long×8' wide×8' 6" intermodal container may be framed as shown in FIGS. 9A-9C.

The solar panels 112 on container 110 may be electrically interconnected in a variety of ways including in parallel or in series, as shown for example in FIGS. 8A and 8B, respectively. In the embodiment shown in FIG. 8A each panel 112 is connected in parallel to one or more charge controller(s) 802 and a battery bank 804. In the embodiment shown in FIG. 8B each panel 112 is connected in series. The size of the battery bank and number of voltage regulators depends on the size of the array (number and size of photovoltaic panels). The battery bank 804 is shown generally and may comprise one or more batteries that are positioned wholly within a single container 110, are wholly positioned externally to any container 110, are positioned in multiple containers 110 or are partially positioned in one or more containers 110 and partially positioned externally from any container 110. For a 40-foot intermodal container the number of panels 112 can be in the range of 78-80 panels. The charge controller 802 may be conventional and operates to (i) reduce the voltage generated by the panel 112 to match that required by the battery 804, (ii) monitor voltage of the battery and disconnect the battery when it drops below a certain level and (iii) stop current backflow to the panel 112. In some embodiments a a power inverter 806 may also be employed to convert the DC generated by the panel 112 to AC.

FIGS. 9A, 9B and 9C illustrate details of one embodiment of mounting of solar panels 112 to a shipping container. In one embodiment, solar panels 112 are mounted to a prefabricated frame that is attached to a container 110. This permits easy replacement of solar panels 112 on a container 110, which may be necessary given that shipping containers have a lifetime of approximately twenty-five years, which can be longer with maintenance. Replacement of solar panels 112 may be necessary due to damage, which can occur during loading and unloading of a container for example. Replacement of solar panels 112 may also be necessary to upgrade solar panel 112 efficiency as efficiency of solar panels 112 improves over time. In the embodiment shown in FIG. 9A, panels 112 are positioned substantially edge to edge to maximize surface area that is covered by the solar panels on the side of the container. The panels are attached to the container by way of threaded steel stock 902 welded to the side of the container, which can be seen at 9-A showing a side view of threaded steel stock 902. The panel 112 is positioned such that the threaded steel stock extends through mounting holes positioned generally near each corner in the panel (or a frame on which the panel is mounted). The mounting holes in a panel 112 can be seen more clearly at the exploded view 9-B in FIG. 9 showing panel. A metal frame (e.g., aluminum) 1002 (explained in more detail in FIGS. 10A-10B) with appropriately placed mounting holes is positioned on top or around the edge of the panels and secured to the threaded steel stock by way of fasteners such as wing nuts, lock washers and an adhesive (such as Loctite™) as needed. FIGS. 9B and 9C illustrate panel placement and mounting on ends of a container. In one embodiment, each panel 112 has a separate frame associated therewith. In another embodiment, a single frame spans multiple panels. In one embodiment, once a set, or all of the panels 112 on a particular surface of the container 110 are placed onto the threaded stock 902, the frame is placed over the top and secured with wing nuts, lock washers and Loctite™. A frame per panel 112 allows for installation or removal for maintenance or damage replacement without impacting the remaining panels 112. Independent framed panels 112 can be interlocked together to create a larger framed area. Mounting of a larger framed area to the container 110 can essentially be the same as this can all be prefabricated ahead of time.

Figure 10A:
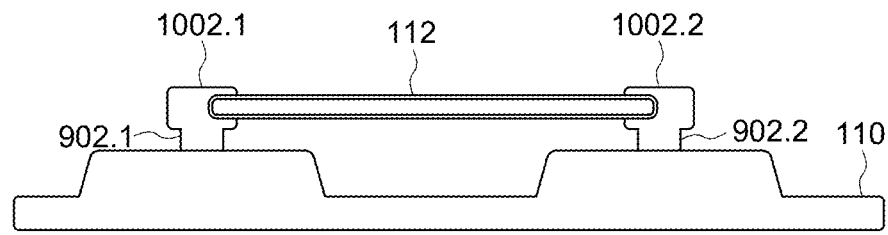
FIGS. 10A, 10B and 10C illustrate various embodiments of mounting of a solar panel to a container by way of a sleeve.
Figure 10B:
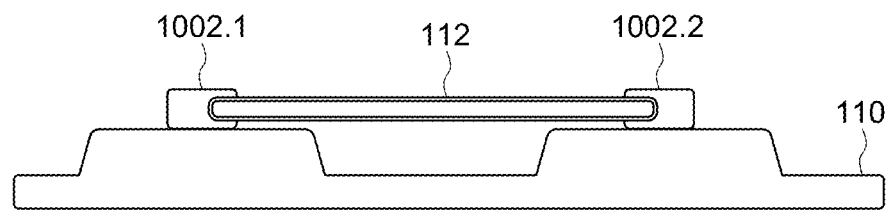
Figure 10C:
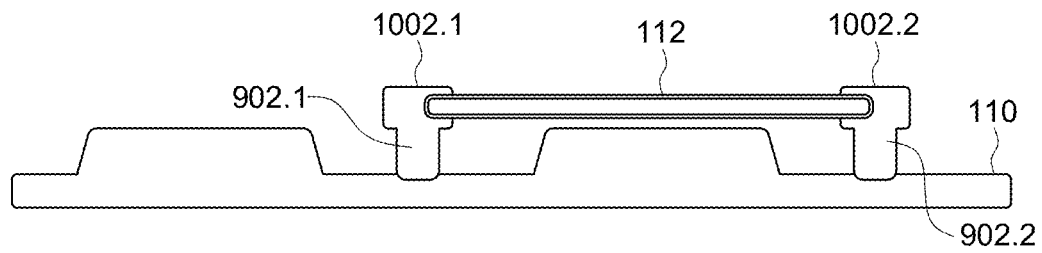

In one embodiment, as seen in FIG. 10A, the prefabricated frame can take the form of a metallic sleeve 1002 that surrounds a portion of an edge of panel 112. The metallic sleeve can be welded onto the container, be attached by way of threaded steel stock 902 (shown specifically as 902.1 and 902.2) as described above. As seen in FIG. 10A, the threaded steel stock 902 is mounted to the container 110 on the raised portion of the corrugated surface of the container 110. The metallic sleeve may extend along the entire side of a panel or multiple sleeves may be disposed at intervals along a side of a panel. In one embodiment, a two-part epoxy may also be employed to more securely attach the sleeve 1002 to the container 110. FIG. 103 shows another embodiment in which the metallic sleeve 1002 is mounted directly to the raised portion of the corrugated surface of the container 110. In such an embodiment the metallic sleeve 1002 may be welded to the container 110 or may be attached by way of an adhesive such as a two-party epoxy. FIG. 10C shows another embodiment, similar to that of FIG. 10A with the difference that the threaded steel stock 902 is mounted to the container 110 on the depressed portion of the corrugated surface of the container 110. As seen, the stock 902 is of sufficient length to elevate the panel 112 above the elevation of the raised portion of the corrugated surface of the container 110.

The aluminum frame provides additional support and rigidity for the flex panels without adding any significant weight or thickness to the panels. This also allows the frame to be prefabricated and then the mounting of the frame on the cube or container is just a matter of sliding the pre-drilled holes in the frame over 10 mm lengths of 4 mm diameter steel threaded round stock that is tack welded to the side of the container. The frame is then secured to the container by tightening wing nuts with lock washers over the threaded stock. In one embodiment, the aluminum flat bar frame encompasses all needed fasteners aside from the threaded round stock that would be welded to the side of the container. Electrical conduits may be routed through the frame and consolidated at one main connection terminal.

In some embodiments, monitoring of the solar panels 112 may be employed to automatically or semi-automatically monitor damage to one or more of the panels on a container and/or to identify when maintenance, such as cleaning may be required. Such monitoring may be performed by way of one or more cameras to visually monitor solar panels 112 on a container. Such cameras may be mounted to the container or may be mounted separately from the container. Monitoring may also be performed by measuring the electrical output of one or more panels on a container. Such monitoring may be performed for each individual panel or collectively for multiple panels on a container. Measurements taken from such monitoring may be controlled and transmitted to a monitoring station, by way of computerized equipment, to permit deployment of personnel to perform necessary maintenance.

In some embodiments, mechanisms may be employed to easily clean the surface of the panels to ensure optimal production. Such mechanisms may employ water jets positioned to easily clean the panels. A freshwater washdown is typically done by crew of a ship if there are long periods without rain. However, freshwater is of limited supply onboard but sometimes is necessary to eliminate salt build up on equipment. For shore-based installation such as a container terminal a freshwater washdown can be done at any time.

Figure 11A:
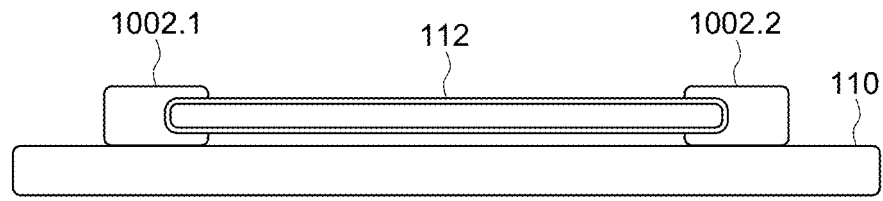
FIGS. 11A and 11B illustrate another embodiment of a container to which a solar panel is mounted.
Figure 11B:
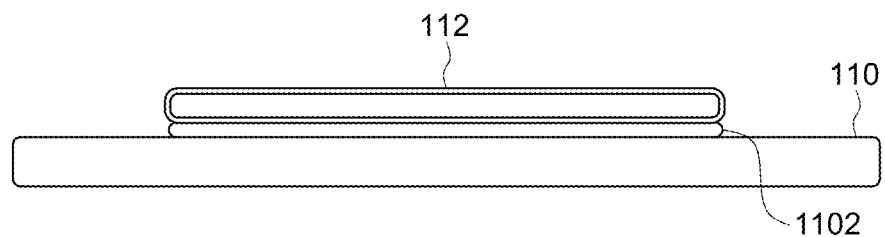

FIGS. 11A and 11B illustrate alternative embodiments of mounting of a solar panel. In the embodiment of FIG. 11A, the container 110 is constructed such that one or more of the exterior faces is substantially flat instead of being corrupted as in the embodiment of FIG. 10. Intermodal containers are often constructed with corrugated surfaces to provide additional strength. In the embodiment of FIG. 11A the container 110 has an alternative construction that provides the necessary strength and rigidity by other means. In the embodiment of FIG. 11A, the mounting of panel 112 to container 110 is as described above in connection with FIG. 10B. In the embodiment of FIG. 11B, the container 110 also has one or more exterior faces that are substantially flat. In the embodiment of FIG. 11B, the panel 112 is mounted to container 110 by way of an adhesive 1102. In one embodiment the adhesive 1102 takes the form of a two-part epoxy. Adhesive mounting directly to the corrugated surface of a shipping container 110 may be problematic and as such, in one embodiment, a piece of sheet metal (similar to the frame mounting method) is mounted to the container 110 and this provides a flat surface to work with. A piece of corrugated plastic may then be glued to the sheet metal, using a two-part epoxy. This creates an air buffer allowing the panel 112 to breath and thereby dissipate heat. The bottom side of the panel 112 may then be glued, using a two-part epoxy, to the sheet of corrugated plastic. Additionally, in one embodiment, the eyelets noted herein may be tie wrapped to the sheet metal by drilling a hole in the sheet metal in that location and applying a tie wrap through the eyelet and the hole in the sheet metal. The benefits of such an arrangement are reduced space and weight to that of a framed installation.

In some, and perhaps many, embodiments, consideration needs to be given to mounting the panels 112, in the various configurations shown in FIGS. 10A, 10B, 10C, 11A, 11B and elsewhere in this disclosure, in a manner to ensure the resulting container 110 is "marine grade" to withstand the potential hurricane force winds that may be encountered at sea.

The below table provides an example calculation of the power generation capability of two typical sizes of shipping containers 110 equipped with solar panels 112 on five of six surfaces. For example, a 40' ISO container has a solar exposure (5 of 6 sides) of $$29.74 \text{ m}^2 \text{ (surface area of top)} + 12.64 \text{ m}^2 \text{ (two ends)} + 63.1442 \text{ m}^2 \text{ (two sides)} = 105.53 \text{ m}^2$$

Each solar panel 112 for this calculation is assumed to produce 175 watts. The total represents an assumption that all surfaces will product the power shown, which is an assumption that will change depending on the amount of sunlight that reaches each of the surfaces.

| 20-foot container | 40-foot container |
|---|---|
| 2 sides × 12 panels × 175 watts = 4.2 kW | 2 sides × 24 panels × 175 watts = 8.4 kW |
| 1 top × 12 panels × 175 watts = 2.1 kW | 1 top × 24 panels × 175 watts = 4.2 kW |
| 1 end × 2 panels × 175 watts = 350 watts | 1 end × 2 panels × 175 watts = 350 watts |
| 1 end × 4 panels × 175 watts = 700 watts | 1 end × 4 panels × 175 watts = 700 watts |
| Total = 7.4 kW | Total = 13.7 kW |

Figure 12:
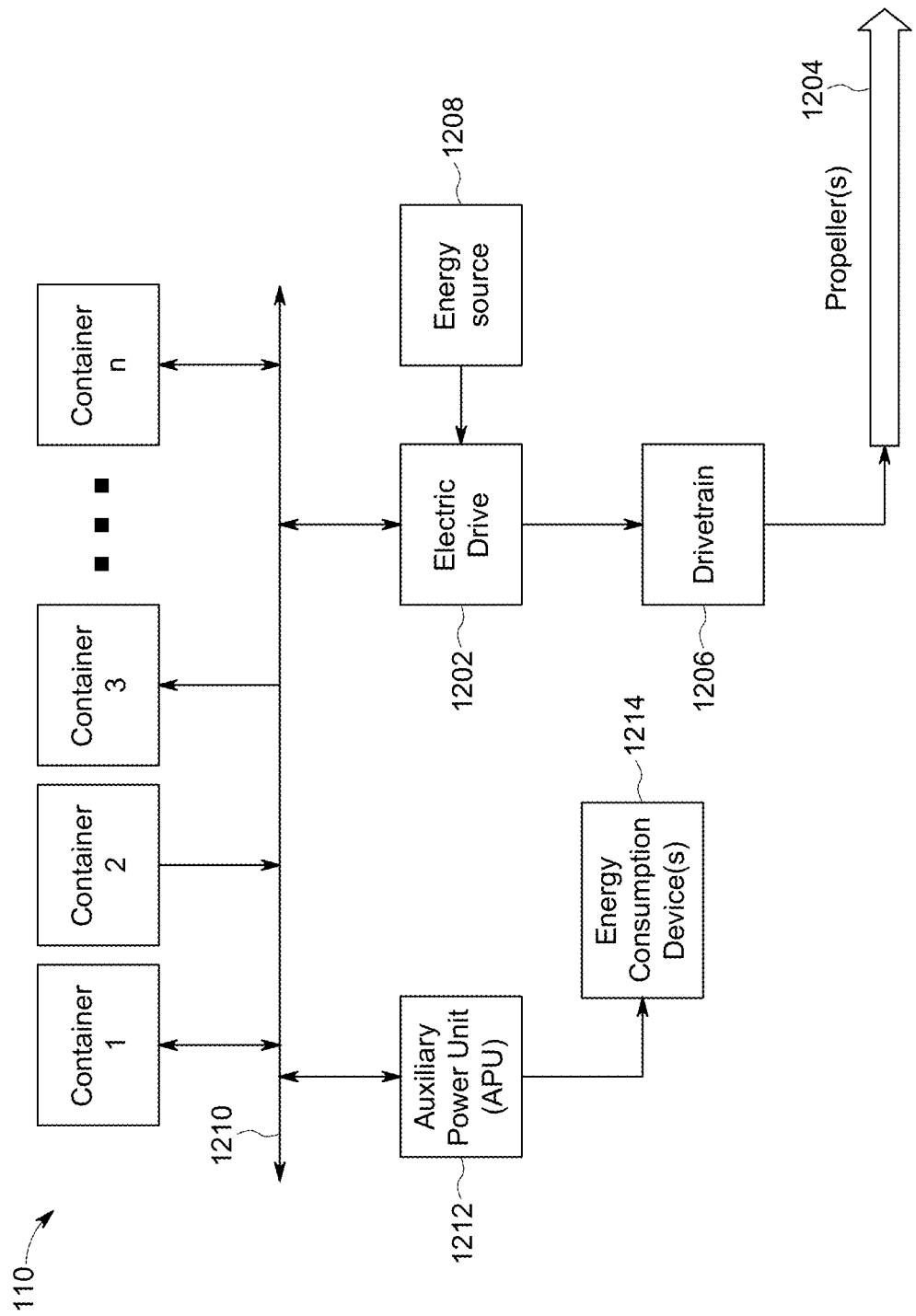
FIGS. 12 and 13 are block diagrams illustrating electrical power flow in two embodiments of a ship employing shipping containers with solar panels.
Figure 13:
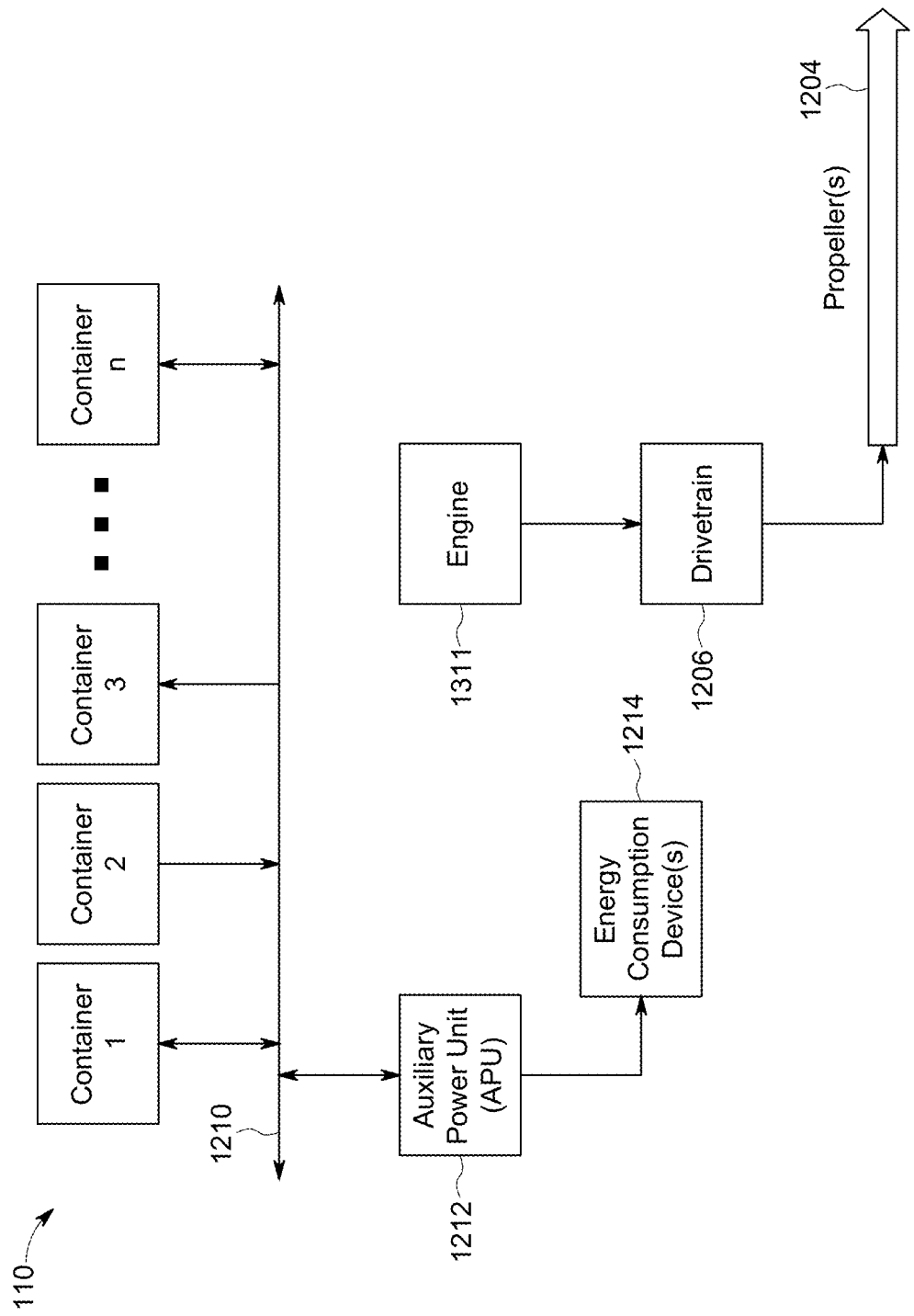

FIGS. 12 and 13 are block diagrams illustrating electrical power flow in two embodiments of a ship employing shipping containers with solar panels 112. The containers 110 may be employed to generate and/or store power in conjunction with other electrical power usage and generation within a ship. In FIG. 12, the ship employs an electric drive 1202 to provide power to turn one or more propeller(s) 1004 via a drivetrain 1206. The electric drive 1202 receives electrical power from an energy source 1203 which may take the form of, for example, a steam turbine. The drivetrain 1206 converts the mechanical power generated by the electric drive 1202 to rotational force required to turn propeller(s) 1204 at the required speed. A power grid 1210 distributes electrical power among various producers and consumers of electrical energy on the ship. The containers 110 take a variety of forms where for example Container 1 provides power to power grid 1210 by way of live power delivered by way of solar panels 112 or stored energy by way of batteries or hydrogen fuel cells, for example. Container 1 also may receive power from power grid 1210 for storage, such as in batteries or hydrogen fuel cells. Container 2 only provides power to power grid 1210 and Container 3 only receives power from power grid 1210. Auxiliary Power Unit (APU) 1212 may take a variety of forms in which is provides power to various energy consumption devices 1214 on the ship. The energy consumption devices 1214 will typically include all devices other than the main motive power of the ship (I.e., the propeller(s) 1204), such as lighting, heating, and cooling, and powering various electrical devices. As can be seen, the containers 110 supplement the substantial electrical power consumption and generation requirements of a ship and thereby reduce unwanted emissions while the vessel is underway at sea, is docked at port and while the vessel is entering and exiting a port. FIG. 13 illustrates an embodiment similar to that of FIG. 12 except that the main motive power of the ship (engine 1311) is entirely separate from the power grid 1210, the APU 1212 and the energy consumption devices 1214.

Figure 14:
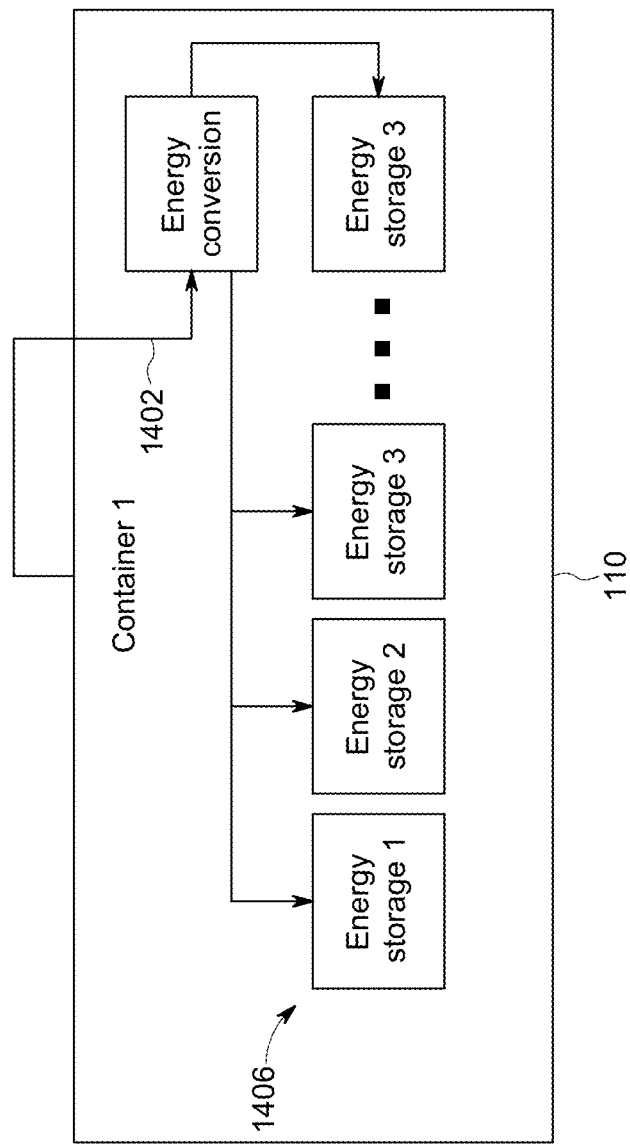
FIG. 14 is a block diagram illustrating an embodiment of power generation and storage in a shipping container with solar panels.

FIG. 14 is a block diagram illustrating an embodiment of power generation and storage in a shipping container with solar panels 112. A container 110 is shown with solar panels 112 (not shown) on one or more exterior surfaces. The solar panels 112 generate electrical energy 1402 which is converted by way of one or more energy conversion devices 1404 to permit storage of the generated electrical energy 1402 to one or more energy storage devices 1406 disposed in the container 110. The embodiment of the container 110 therefore serves as an energy generation and storage device, which may also be referred to as an Energy Storage System (ESS). The energy conversion devices 1404 are shown generally and may take a variety of forms. This includes inverters, voltage converters and other electrical devices that convert electrical energy 1402 to a form to enable storage to one or more batteries which may correspond to one or more of the energy storage devices 1406. The energy conversion devices 1404 may also take the form of one or more electrolyzers that generate, and compress, hydrogen for storage to one or more hydrogen storage tanks which may correspond to one or more of the energy storage devices 1406. Inverters that are employed may take a variety of forms including string (most common when panels are wired together), central (large numbers stringed together, and micro (mounted on each module, plug and play and adaptable).

Figure 15A:
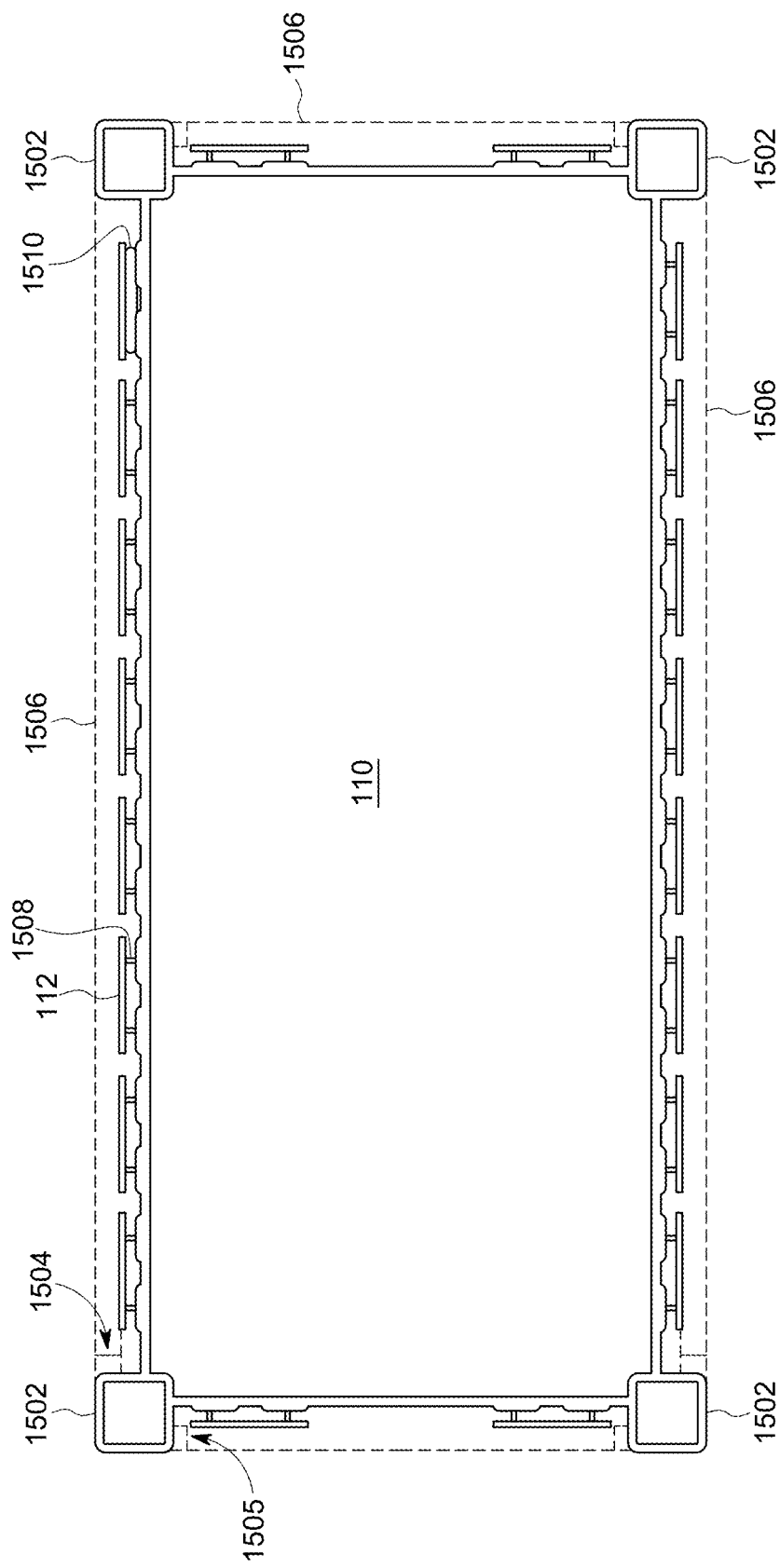
FIGS. 15A, 15B and 15C are top views of a shipping container illustrating various embodiments of placement and mounting of solar panels.
Figure 15B:
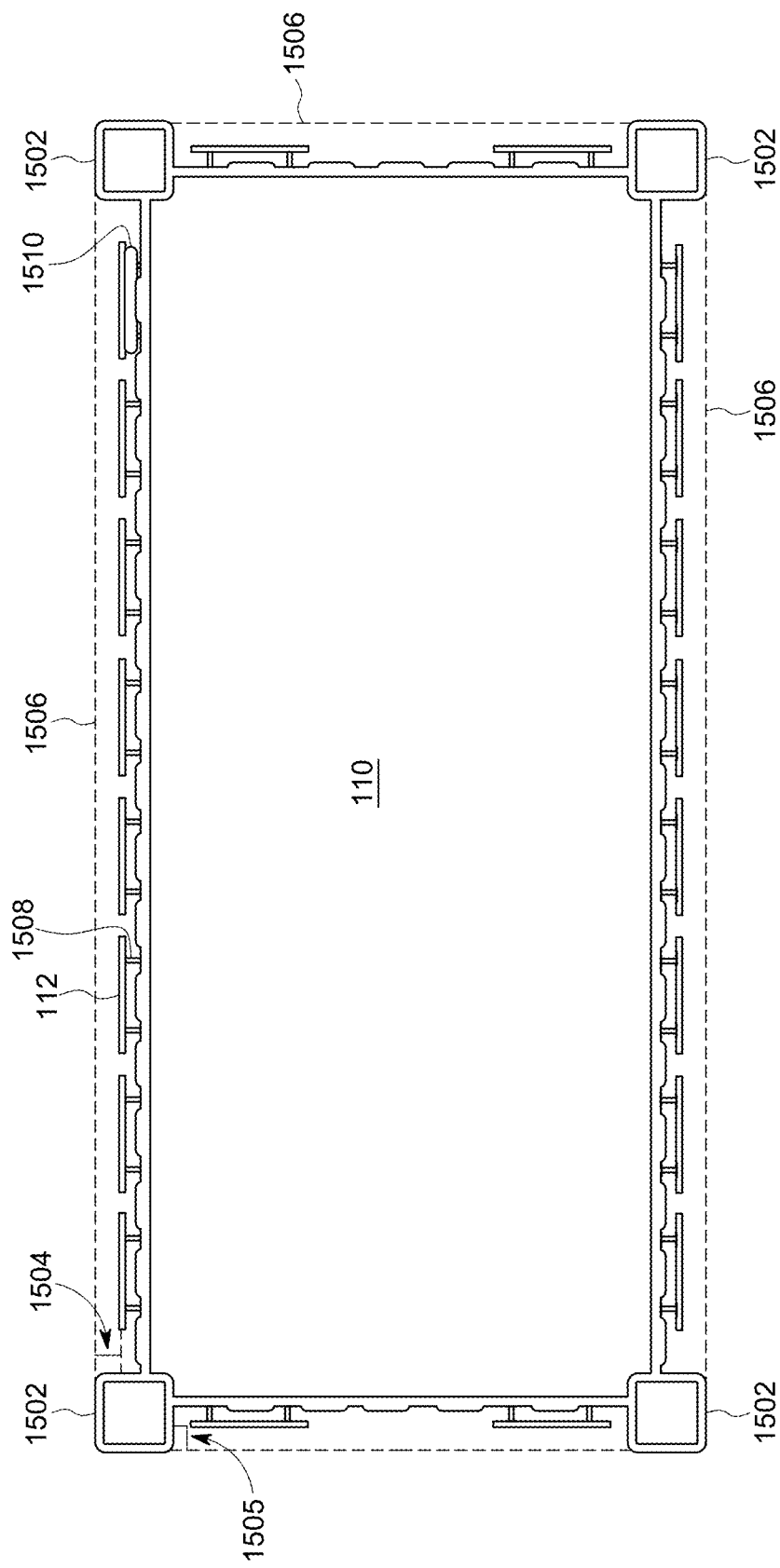
Figure 15C:
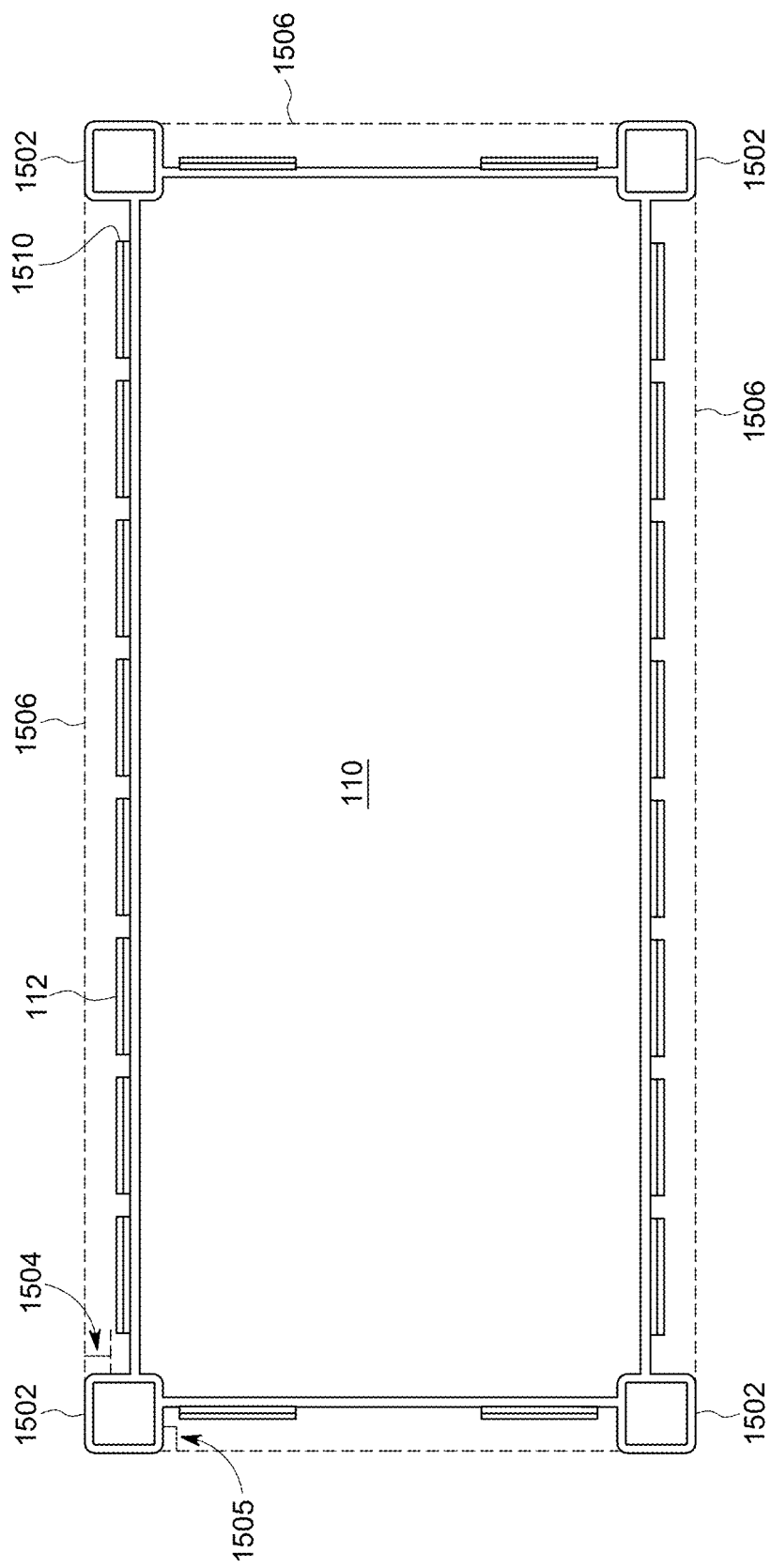

FIGS. 15A, 15B and 15C are top views of a shipping container illustrating various embodiments of placement and mounting of solar panels. In FIG. 15A, each solar panel 112 is mounted to allow for a gap, seen at 1504 and 1505 between an outer edge of the solar panel 112 and an outer edge of the corner post 1502. The outer edges of the four corner posts 1502 establish an outer boundary of the container 110, which outer boundary is designated by the dotted line 1506. This positioning ensures that none of the one more solar panels 112 extends beyond the outer boundary 1506 of the exterior surface of the container 110. Also seen in FIG. 15A are mounting hardware 1508 and a liner 1510 which may optionally be employed to reduce wear of the solar panel 112 due to any movement of the solar panel 112 that may occur relative to the container 110.

In FIG. 15A, the panels 112 are mounted to the container 110 in a manner shown and explained in connection with FIG. 10A in that the threaded stock 902 is mounted to the container 110 in the raised portion of the corrugated surface. In FIG. 15B the panels 110 are mounted to the container 110 in a manner shown and explained in connection with FIG. 10C in that the threaded stock 902 is mounted to the container 110 in the depressed portion of the corrugated surface. If the corner posts 1502 are the same dimensions as in the embodiment of FIG. 15A the gap 1504 in the embodiment of FIG. 15B will be larger. Alternatively, the embodiment of FIG. 15B may be more suitable where the distance between the outer perimeter of the corner post 1502 and the outer perimeter of the exterior surface of the container 110 is smaller than in the embodiment of FIG. 15A. FIG. 15C corresponds to the embodiments illustrated in FIG. 11A or 11B where the exterior surface of the container 110 is flat instead of corrugated. The illustrations in FIGS. 15A, 15B and 15C are shown in simplified form for ease of understanding of the positioning of the panels 112 with respect to the container 110 and hence do not show all of the details of the mounting of the panels to the container.

Certain embodiments of the disclosed container 110 may be employed to form an ESS or Uninterruptible Power supply (UPS) and/or may also be employed to perform what is sometimes known as "peak shaving" in which stored energy in batteries in, or associated with, a container 110 are used to supply power during periods of peak energy use. As an ESS the disclosed embodiment allows for excess wind, or solar energy to be stored, and perhaps sent back to the energy grid.

The batteries may employ a number of different cell types including cylindrical, prismatic, pouch and may also take the form of flow or flooded cell batteries. A Battery Management System (BMS) may be employed in certain embodiments. An advantage of employing an embodiment of the disclosed container with solar panels mounted thereto and batteries contained internally for energy storage as a UPS is that such a container is less subject to ground movement or breaking such as may occur during an earthquake.

Aspects of certain of the embodiments herein can be implemented employing computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Figure 16:
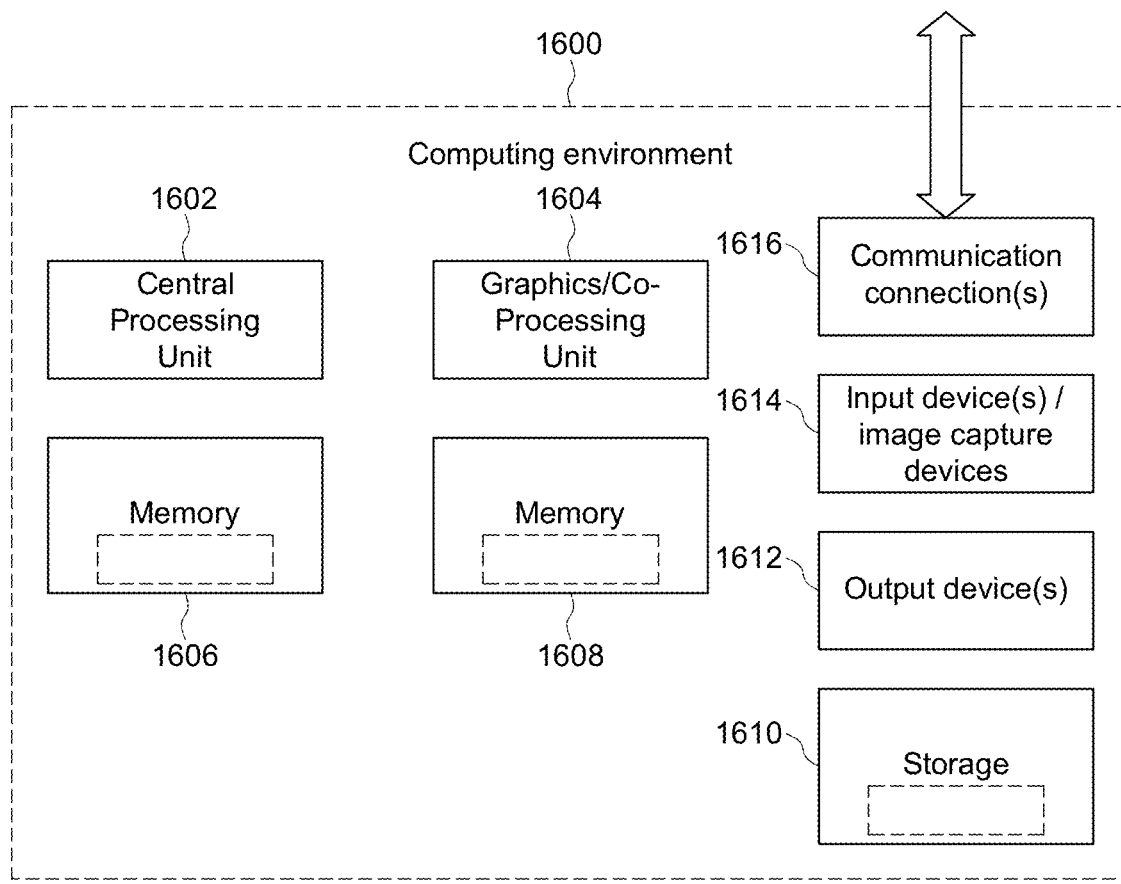
FIG. 16 is a block diagram of computer hardware that may be employed in certain embodiments of computer systems described herein.

FIG. 16 illustrates a block diagram of hardware that may be employed in an implementation of the embodiments disclosed herein employing computer-executable instructions. FIG. 16 depicts a generalized example of a suitable general-purpose computing system 1600 in which the described innovations may be implemented in order to improve the processing speed and efficiency with which the computing system 1600 operates to perform the functions disclosed herein. With reference to FIG. 16 the computing system 1600 includes one or more processing units 1602, 1604 and memory 1606, 1608. The processing units 1602, 1606 execute computer-executable instructions. A processing unit can be a general-purpose central processing unit (CPU), processor in an application-specific integrated circuit (ASIC) or any other type of processor. The tangible memory 1606, 1608 may be volatile memory (e.g., registers, cache, RAM), non-volatile memory (e.g., ROM, EEPROM, flash memory, etc.), or some combination of the two, accessible by the processing unit(s). The hardware components in FIG. 16 may be standard hardware components, or alternatively, some embodiments may employ specialized hardware components to further increase the operating efficiency and speed with which the system 10 operates. The various components of computing system 1600 may be rearranged in various embodiments, and some embodiments may not require nor include all of the above components, while other embodiments may include additional components, such as specialized processors and additional memory.

Computing system 1600 may have additional features such as for example, storage 1610, one or more input devices 1614, one or more output devices 1612, and one or more communication connections 1616. An interconnection mechanism (not shown) such as a bus, controller, or network interconnects the components of the computing system 1600. Typically, operating system software (not shown) provides an operating system for other software executing in the computing system 1600, and coordinates activities of the components of the computing system 1600.

The tangible storage 1610 may be removable or non-removable, and includes magnetic disks, magnetic tapes or cassettes, CD-ROMs, DVDs, or any other medium which can be used to store information in a non-transitory way, and which can be accessed within the computing system 1600. The storage 1610 stores instructions for the software implementing one or more innovations described herein.

The input device(s) 1614 may be a touch input device such as a keyboard, mouse, pen, or trackball, a voice input device, a scanning device, or another device that provides input to the computing system 1600. For video encoding, the input device(s) 1614 may be a camera, video card, TV tuner card, or similar device that accepts video input in analog or digital form, or a CD-ROM or CD-RW that reads video samples into the computing system 1600. The output device(s) 1612 may be a display, printer, speaker. CD-writer, or another device that provides output from the computing system 1600.

The communication connection(s) 1616 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:
1. A transportation vehicle comprising:
one or more spaces to accept one or more moveable shipping containers;
each shipping container of the plurality of moveable shipping containers taking a form of a cuboid comprising six faces with each face substantially in the shape of a rectangle, the cuboid comprising an interior defined by an exterior formed of six exterior surfaces, each surface of the six exterior surfaces corresponding to an exterior face of the cuboid;
one or more of the six exterior surfaces of one or more of the shipping containers having attached thereon one or more photovoltaic panels that together occupy substantially all of the corresponding exterior surface and wherein none of the one more photovoltaic panels extends beyond an outer boundary of the corresponding exterior surface;

wherein each shipping container that has attached thereon one or more photovoltaic panels includes a first container electrical connector to provide electrical energy generated by the one or more photovoltaic panels attached to the shipping container;

an electrical grid comprising one or more first grid connectors, each first grid connector adapted to attach to a first container electrical connector; and one or more energy storage units connected to the electrical grid to store energy generated by the one or more shipping containers that has attached thereon one or more photovoltaic panels.

2. The transportation vehicle of claim 1 wherein one or more of the energy storage units is disposed within a shipping container that has a second container electrical connector adapted to attach to the electrical grid.

3. The transportation vehicle of claim 2 wherein one or more of the energy storage units comprises one or more batteries.

4. The transportation vehicle of claim 2 wherein one or more of the energy storage units comprises:
a hydrogen electrolyzer electrically coupled to the electrical grid and attached to a source of water to generate hydrogen; and
one or more storage tanks to store hydrogen generated by the hydrogen electrolyzer.

5. The transportation vehicle of claim 2 wherein one or more of the energy storage units comprises:
a first shipping container having disposed within a hydrogen electrolyzer electrically coupled to the electrical grid and attached to a source of water to generate hydrogen; and
a second shipping container having disposed within one or more storage tanks to store hydrogen generated by the hydrogen electrolyzer.

6. The transportation vehicle of claim 4 wherein one or more of the energy storage units comprises:
a compressor electrically coupled to the electrical grid that receives hydrogen generated by the hydrogen electrolyzer and provides compressed hydrogen to the one or more storage tanks.

7. The transportation vehicle of claim 4 wherein one or more of the energy storage units comprises:
a fuel cell, coupled to a source of hydrogen, for generating electrical energy from the hydrogen and further electrically coupled to the electrical grid to provide electrical energy to the electrical grid.

8. The transportation vehicle of claim 7 wherein one or more of the energy storage units comprises:
a converter to match electrical energy generated by the fuel cell to energy requirements of the electrical grid.

9. The transportation vehicle of claim 4 wherein the electrical grid is connected to provide electrical energy to energy consumption devices on the transportation vehicle.

10. The transportation vehicle of claim 4 wherein the transportation vehicle is a watercraft.

11. The transportation vehicle of claim 4 wherein the transportation vehicle is a train.

12. The transportation vehicle of claim 4 wherein the transportation vehicle is a truck.

13. The transportation vehicle of claim 1 wherein the transportation vehicle is a watercraft.

14. The transportation vehicle of claim 1 wherein the transportation vehicle is a train.

15. The transportation vehicle of claim 1 wherein the transportation vehicle is a truck.

16. An intermodal container taking a form of a cuboid comprising six faces with each face substantially in the shape of a rectangle, the cuboid comprising an interior defined by an exterior formed of six exterior surfaces, each surface of the six exterior surfaces corresponding to an exterior face of the cuboid, the intermodal container comprising:

one or more of the six exterior surfaces having attached thereon one or more photovoltaic panels that together occupy substantially all of the corresponding exterior surface and wherein none of the one more photovoltaic panels extends beyond an outer boundary of the corresponding exterior surface;

a first container electrical connector to provide electrical energy generated by the one or more photovoltaic panels attached to the intermodal container, the first container electrical connector adapted to connect to an electrical grid disposed on a vehicle on which the intermodal container is placed.

17. The intermodal container of claim 16 comprising:
one or more of energy storage units disposed within the intermodal container; and
a second container electrical connector adapted to attach to the electrical grid.

18. The intermodal container of claim 17 wherein one or more of the energy storage units comprises one or more batteries.

19. The intermodal container of claim 18 wherein one or more of the energy storage units comprises:
a hydrogen electrolyzer electrically coupled to the electrical grid and attached to a source of water to generate hydrogen; and
one or more storage tanks to store hydrogen generated by the hydrogen electrolyzer.

20. The intermodal container of claim 18 wherein one or more of the energy storage units comprises:
a compressor electrically coupled to the electrical grid that receives hydrogen generated by the hydrogen electrolyzer and provides compressed hydrogen to the one or more storage tanks.

21. The intermodal container of claim 18 wherein one or more of the energy storage units comprises:
a fuel cell, coupled to a source of hydrogen, for generating electrical energy from the hydrogen and further electrically coupled to the electrical grid to provide electrical energy to the electrical grid.

* * * * *